US012683773B2

(12) United States Patent
Murakami et al.

(10) Patent No.: US 12,683,773 B2
(45) Date of Patent: Jul. 14, 2026

(54) CONTROL DEVICE, QUANTUM CRYPTOGRAPHIC COMMUNICATION SYSTEM, CONTROL METHOD, AND COMPUTER PROGRAM PRODUCT

(71) Applicant: KABUSHIKI KAISHA TOSHIBA, Tokyo (JP)

(72) Inventors: Akira Murakami, Tama Tokyo (JP); Yoshimichi Tanizawa, Yokohama Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 176 days.

(21) Appl. No.: 18/457,628

(22) Filed: Aug. 29, 2023

(65) Prior Publication Data

US 2024/0313954 A1 Sep. 19, 2024

(30) Foreign Application Priority Data

Mar. 17, 2023 (JP) ................................. 2023-043388

(51) Int. Cl.
*H04L 9/08* (2006.01)
(52) U.S. Cl.
CPC ................................. *H04L 9/0852* (2013.01)
(58) Field of Classification Search
None
See application file for complete search history.

(56) References Cited

U.S. PATENT DOCUMENTS 9,560,428 B2 * 1/2017 Yan ......................... H04J 14/025
10,103,799 B2 * 10/2018 Luddy ............... H04L 25/03898
11,442,652 B1 * 9/2022 Dailey ................ H04L 67/1097
11,586,385 B1 * 2/2023 Lercari ............... G06F 12/0246
12,181,981 B1 * 12/2024 Heidemeyer ......... G06F 16/275
2006/0045527 A1 3/2006 Maeda et al.
(Continued)

FOREIGN PATENT DOCUMENTS

EP 3 627 757 A1 3/2020
EP 3 989 476 A1 4/2022
(Continued)

OTHER PUBLICATIONS

Jeremy Constantin et al., "An FPGA-Based 4 Mbps Secret Key Distillation Engine for Quantum Key Distribution Systems," J. Sign. Process Sys., vol. 86, No. 1, 15 pages, DOI:10.1007/s11265-015-1086-1 (2015).

(Continued)

*Primary Examiner* — Trang T Doan

(74) *Attorney, Agent, or Firm* — Finnegan, Henderson, Farabow, Garrett & Dunner, LLP

(57) ABSTRACT

According to one embodiment, a control device includes one or more processors and an output circuitry. The one or more processors are configured to acquire, via a quantum communication path, information indicating a state of quantum communication from a plurality of reception devices that receive photons, and determine resources to be allocated to a plurality of key distillation modules of a server device based on the information indicating the state of quantum communication. The output circuitry is configured to output resource information indicating the resources to be allocated to the plurality of key distillation modules to the server device.

9 Claims, 8 Drawing Sheets

(56) References Cited

U.S. PATENT DOCUMENTS

| | | | | |
|---|---|---|---|---|
| 2009/0138785 A1* | 5/2009 | Sakai | H03M 13/1111 | 714/790 |
| 2010/0144363 A1* | 6/2010 | De Rosa | H04W 72/52 | 455/452.1 |
| 2013/0325453 A1* | 12/2013 | Levien | G10L 21/00 | 704/201 |
| 2016/0142203 A1* | 5/2016 | Tanizawa | H04L 9/0852 | 380/280 |
| 2016/0197723 A1 | 7/2016 | Takahashi | | |
| 2017/0264433 A1* | 9/2017 | Tanizawa | H04L 9/0858 | |
| 2017/0279540 A1* | 9/2017 | Tanizawa | H04B 10/70 | |
| 2018/0167257 A1* | 6/2018 | Sanders | H04L 41/122 | |
| 2019/0222415 A1* | 7/2019 | Kikawada | H04L 9/0858 | |
| 2019/0354628 A1* | 11/2019 | Grunwald | G06F 16/1824 | |
| 2019/0379463 A1* | 12/2019 | Shields | H04L 9/0852 | |
| 2020/0092089 A1* | 3/2020 | Takahashi | H04L 9/0852 | |
| 2020/0099520 A1 | 3/2020 | Legré et al. | | |
| 2020/0396760 A1* | 12/2020 | Yi | H04W 72/23 | |
| 2021/0166348 A1* | 6/2021 | Na | G06N 3/04 | |
| 2021/0342836 A1* | 11/2021 | Cella | G06N 20/00 | |
| 2022/0113881 A1* | 4/2022 | Roberts | G06F 3/0659 | |
| 2022/0131689 A1 | 4/2022 | Ito et al. | | |
| 2022/0197306 A1* | 6/2022 | Cella | G05D 1/0297 | |
| 2022/0224438 A1* | 7/2022 | Park | H04W 72/0446 | |
| 2022/0366494 A1* | 11/2022 | Cella | G06N 3/006 | |
| 2022/0374277 A1* | 11/2022 | Kim | H04W 28/0933 | |
| 2023/0120629 A1* | 4/2023 | Cui | H04L 41/5067 | 709/226 |
| 2023/0134266 A1* | 5/2023 | Sundararajan | G06F 16/128 | 711/154 |
| 2023/0409387 A1* | 12/2023 | Gupta | G06F 9/44505 | |
| 2024/0178862 A1* | 5/2024 | Oh | H04L 5/00 | |
| 2024/0305533 A1* | 9/2024 | Bai | H04W 24/02 | |
| 2025/0071040 A1* | 2/2025 | Wang | G16Y 40/50 | |

FOREIGN PATENT DOCUMENTS

| | | | |
|---|---|---|---|
| JP | 4784202 | B2 | 10/2011 |
| JP | 2016-127482 | A | 7/2016 |
| JP | 2020-48069 | A | 3/2020 |
| JP | 2022-70059 | A | 5/2022 |

OTHER PUBLICATIONS

N. Walenta et al., "A fast and versatile quantum key distribution system with hardware key distillation and wavelength multiplexing," New J. of Physics, vol. 16, Art. 13047, 20 pages, DOI:10.1088/1367-2630/16/1/013047 (2014).

Norbert Lütkenhaus et al., "Quantum key distribution with realistic states: photon-number statistics in the photon-number splitting attack," New J. Phys. 4, 44, pp. 44.1-44.9 (2002).

Japan Patent Office, Office Action in JP App. No. 2023-043388 (Aug. 5, 2025).

* cited by examiner

Figure 5:
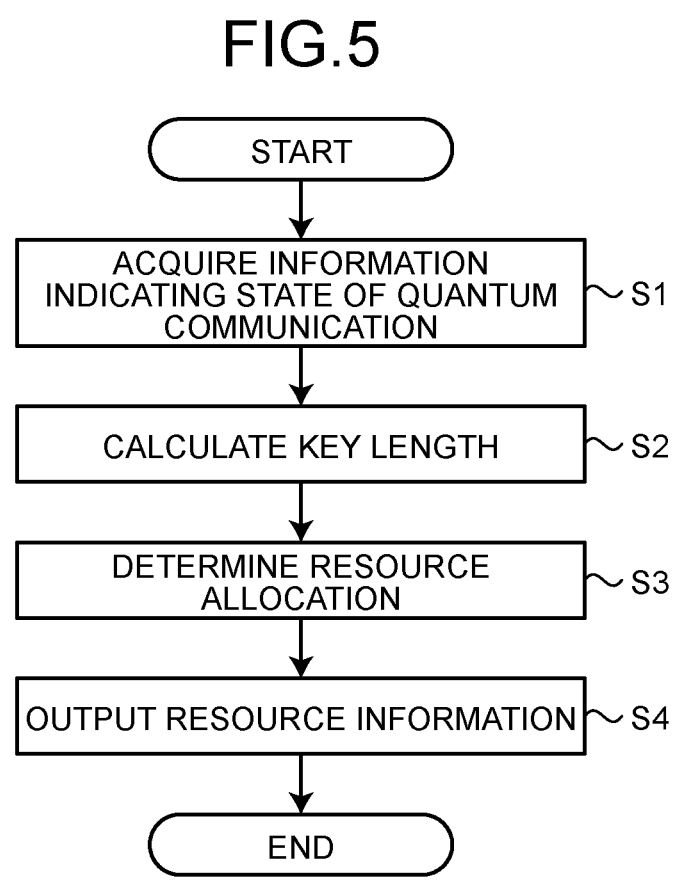

START

ACQUIRE INFORMATION INDICATING STATE OF QUANTUM COMMUNICATION    ~S1

CALCULATE KEY LENGTH    ~S2

DETERMINE RESOURCE ALLOCATION    ~S3

OUTPUT RESOURCE INFORMATION    ~S4

END

CONTROL DEVICE, QUANTUM CRYPTOGRAPHIC COMMUNICATION SYSTEM, CONTROL METHOD, AND COMPUTER PROGRAM PRODUCT

CROSS-REFERENCE TO RELATED APPLICATIONS

This application is based upon and claims the benefit of priority from Japanese Patent Application No. 2023-043388, filed on Mar. 17, 2023; the entire contents of which are incorporated herein by reference.

FIELD

Embodiments described herein relate generally to a control device, a quantum cryptographic communication system, an information processing device, a key management device, a control method, an information processing method, a key management method, and a computer program product.

BACKGROUND

Quantum Key distribution technology (hereinafter referred to as QKD) is a technology for securely sharing an encryption key between a QKD device that continuously transmits a single photon and a QKD device that receives a single photon, which are connected by an optical fiber link. An encryption key shared by the QKD is guaranteed not to be eavesdropped based on the principle of quantum mechanics. It is guaranteed by information theory that data subjected to encrypted data communication using a cryptographic communication method called a one-time pad cannot be decrypted by an eavesdropper having any knowledge by using a shared encryption key.

However, in the conventional technique, it is difficult to more appropriately determine resources to be allocated to the plurality of key distillation modules.

BRIEF DESCRIPTION OF THE DRAWINGS

FIG. 4 is a diagram illustrating an example of a device configuration of a quantum cryptographic communication system according to a first embodiment;
FIG. 5 is a flowchart illustrating an example of a control method according to the first embodiment;
FIG. 6 is a diagram illustrating an example of a device configuration of a quantum cryptographic communication system according to a second embodiment;
FIG. 7 is a diagram illustrating an example of a device configuration of a quantum cryptographic communication system according to a third embodiment.

DETAILED DESCRIPTION

In general, according to one embodiment, a control device includes one or more processors and an output circuitry. The one or more processors are configured to acquire, via a quantum communication path, information indicating a state of quantum communication from a plurality of reception devices that receive photons, and determine resources to be allocated to a plurality of key distillation modules of a server device based on the information indicating the state of quantum communication. The output circuitry is configured to output resource information indicating the resources to be allocated to the plurality of key distillation modules to the server device.

Exemplary embodiments of a control device, a quantum cryptographic communication system, an information processing device, a key management device, a control method, an information processing method, a key management method, and a computer program product will be described below in detail with reference to the accompanying drawings. The present invention is not limited to the following embodiments.

Hereinafter, an encryption key exchange device using a quantum key distribution (QKD) technology is referred to as a QKD device. An encryption key exchange system including a plurality of QKD devices is referred to as a QKD system. First, an example of the QKD system will be described.

Figure 1:
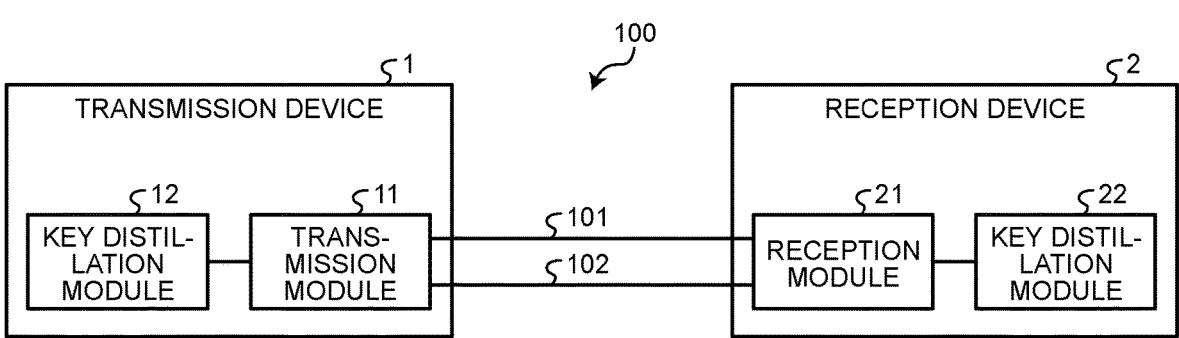
FIG. 1 is a diagram illustrating a configuration example of a single QKD system.

FIG. 1 is a diagram illustrating a configuration example of a single QKD system. A QKD system 100 includes a transmission device 1, a reception device 2, and two optical fiber links 101 and 102.

The transmission device 1 is a QKD device on the transmission side. The transmission device 1 includes a transmission module 11 and a key distillation module 12. The transmission module 11 generates a photon, encodes key information indicating bit information of 0 or 1 in the photon, and transmits the photon encoded with key information to the reception device 2. The key distillation module 12 performs key distillation processing of generating a final encryption key from the transmitted key information.

The reception device 2 is a QKD device on the reception side. The reception device 2 includes a reception module 21 and a key distillation module 22. The reception module 21 receives the photon sent from the transmission module 11 of the transmission device and decodes the key information. The key distillation module 22 performs key distillation processing of generating a final encryption key from the received key information.

The optical fiber link 101 is used as a quantum communication path for transmitting photons (quantum signals) encoded with key information.

The optical fiber link 102 is used as a classical communication path for transmitting a classical signal including QKD control information. For example, the classical communication path is used for transmission of a synchronization signal between a transmitter of photons used by the transmission device 1 and the reception device 2 of photons used by the reception device 2, and an optical signal such as data communication.

Since the quantum signal in the quantum communication path is very weak (one-photon level per pulse) as compared with the optical signal in the classical communication path, the optical fiber links 101 and 102 which are physically different are usually used for the quantum communication path and the classical communication path. In addition, in order to transmit a signal dedicated to the QKD device, the optical fiber link 101 of the quantum communication path and the optical fiber link 102 of the classical communication path need to be dark fibers.

An example of an encryption key generation processing by the QKD system 100 will be described.

1. Photon Transmission

First, the transmission module 11 selects a basis to be used in encoding the key information. Then, the transmission module 11 encodes the key information into a single photon by modulating the polarization state and the phase state of the single photon on the basis of the selected basis, and then transmits the single photon to the reception module 21 via the quantum communication path.

2. Photon Reception

The reception module 21 selects a basis to be used for decoding the single photon sent from the transmission module 11, modulates the single photon on the basis of the selected basis, and then detects the single photon.

3. Key Distillation Processing

The key distillation processing includes the following three processes.

3.1. Sifting Processing

The key distillation modules 12 and 22 exchange the basis information selected on the transmission side and the reception side via the optical fiber link 102 (classical communication path). The key distillation modules 12 and 22 leave the key information in which the basis information matches in transmission and reception, and discard key information other than the key information in which the basis information matches in transmission and reception. Hereinafter, the key information remaining in the shifting processing is referred to as a sifted key.

3.2 Error Correction Process (EC Process)

The key distillation modules 12 and 22 transmit and receive control data via the optical fiber link 102 (classical communication path) and exchange the control data to correct a bit error included in the shifted key so that the transmission side and the reception side have the same key information. The key information thus corrected is referred to as a correction key.

3.3 Privacy Amplification Processing (PA Processing)

The key distillation modules 12 and 22 transmit and receive control data via the optical fiber link 102 (classical communication path) and exchange the control data, thereby performing bitstream compression conversion on the correction key to cancel the amount of information possibly stolen by an eavesdropper. The key compressed and converted in this way is the final encryption key.

Figure 2:
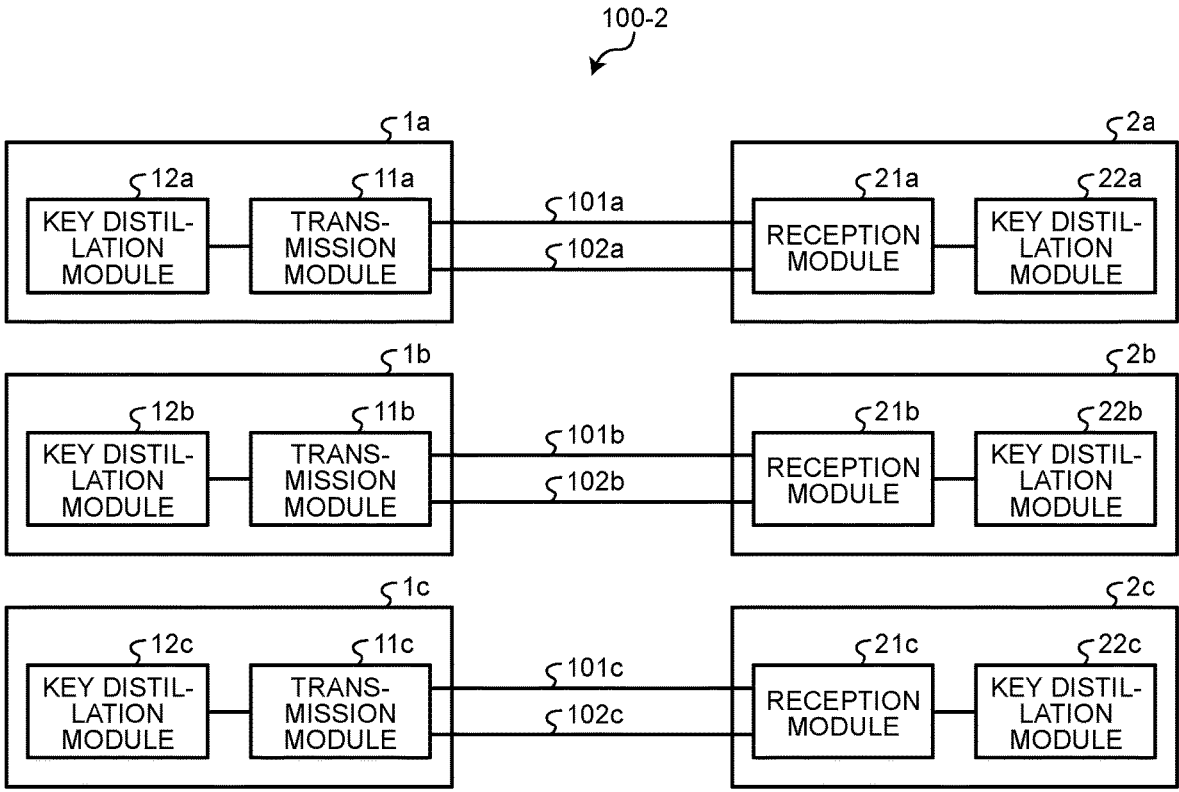
FIG. 2 is a diagram illustrating a configuration example of a QKD system using a plurality of QKD devices.

FIG. 2 is a diagram illustrating a configuration example of a QKD system 100-2 using a plurality of QKD devices. A QKD system 100-2 includes transmission devices 1a to 1c, reception devices 2a to 2c, and six optical fiber links 101a to 101c and 102a to 102c. In the QKD system 100-2, in order to improve the transmission speed of the encryption key shared by the QKD devices, the number of QKD devices to be used is increased to improve the transmission speed of the encryption key in the entire QKD system 100-2.

Hereinafter, in a case where the transmission devices 1a to 1c are not distinguished, they are simply referred to as the transmission devices 1. Similarly, in a case where the reception devices 2a to 2c and the six optical fiber links 101a to 101c and 102a to 102c are not distinguished, they are referred to as the reception devices 2, the optical fiber links 101, and the optical fiber links 102, respectively.

As illustrated in FIG. 2, for example, the transmission speed of the encryption key when three sets of QKD devices are used is three times that when the single set of QKD devices is used. However, in this case, the number of transmission devices 1, reception devices 2, and optical fiber links 101 and 102 to be required increases.

As a method of reducing the number of devices of the key distillation modules 12a to 12c and 22a to 22c that perform the processing, there is a method for performing the plurality of key distillation modules 12 by the same device. The key distillation modules 12 may be implemented as software on a server device, and can be easily implemented by the same device.

Figure 3:
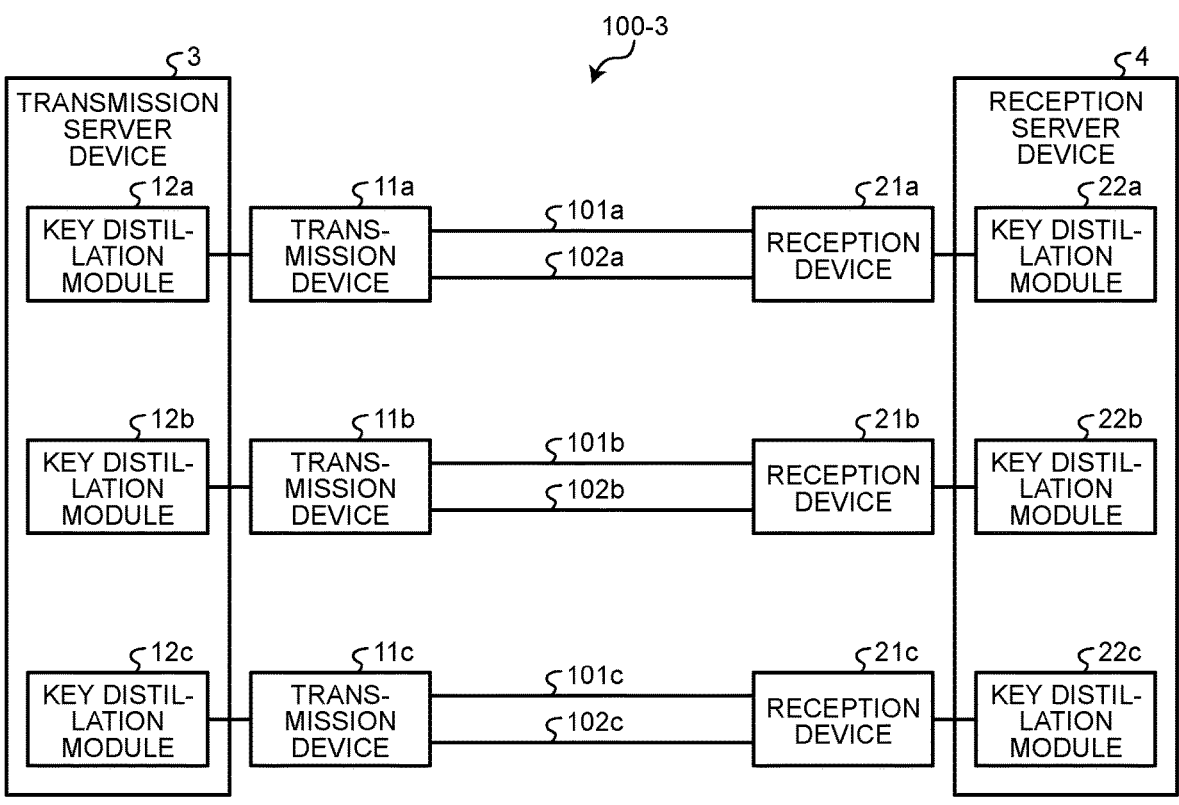
FIG. 3 is a diagram illustrating a configuration example of a QKD system using a plurality of QKD devices.

FIG. 3 is a diagram illustrating a configuration example of a QKD system 100-3 using a plurality of QKD devices. The example of FIG. 3 illustrates a case where three key distillation modules 12a to 12c are implemented in a single transmission server device 3 on the transmission side, and three key distillation modules 22a to 22c are implemented in a single reception server device 4 on the reception side. For example, as illustrated in FIG. 3, by operating the transmission server device 3 and the reception server device 4, the number of devices required for the entire QKD system 100-3 can be reduced, leading to cost reduction.

As described above, in a case where the key distillation module 12 is implemented by the single transmission server device 3 and the key distillation module 22 is implemented by the single reception server device 4, a problem arises in that the processing load of each key distillation process is different and it is necessary to adjust resource allocation to each key distillation processing. The EC processing and the PA processing described above included in the key distillation processing have different processing loads depending on the communication state of the quantum communication path (state of quantum communication). For example, as the number of photons detected (number of detected photons) by the reception device 21 increases, the number of pieces of key information that needs to be processed increases, and the processing load increases. In addition, as a quantum bit error rate (QBER) indicating a quantum error rate is higher, key information that needs to be subjected to error correction increases, and a processing load increases.

There is a possibility that the state of quantum communication dynamically changes, and for example, the number of detected photons and the QBER dynamically change as the optical fiber link 101 between transmission and reception is bent or vibrated. Furthermore, for example, the number of detected photons and the QBER differ depending on individual differences in hardware performance of the transmission device 11 (11a-11c) and the reception device 21 (21a-21c). Since the number of detections and QBER dynamically change, the processing load of the key distillation processing also dynamically changes, and the resources required for the key distillation modules 12 and 22 also dynamically change. Simply allocating resources equally and fixedly to each of the key distillation modules 12 (12a-12c) and 22 (22a-22c) results in a shortage of resources or an excessive resource allocation, and the resource allocation is not efficient.

First Embodiment

Therefore, in the following first embodiment, a configuration for realizing efficient resource allocation by dynamically changing resource allocation to the key distillation modules 12 and 22 according to the state of quantum communication will be described.

Example of Device Configuration

Figure 4:
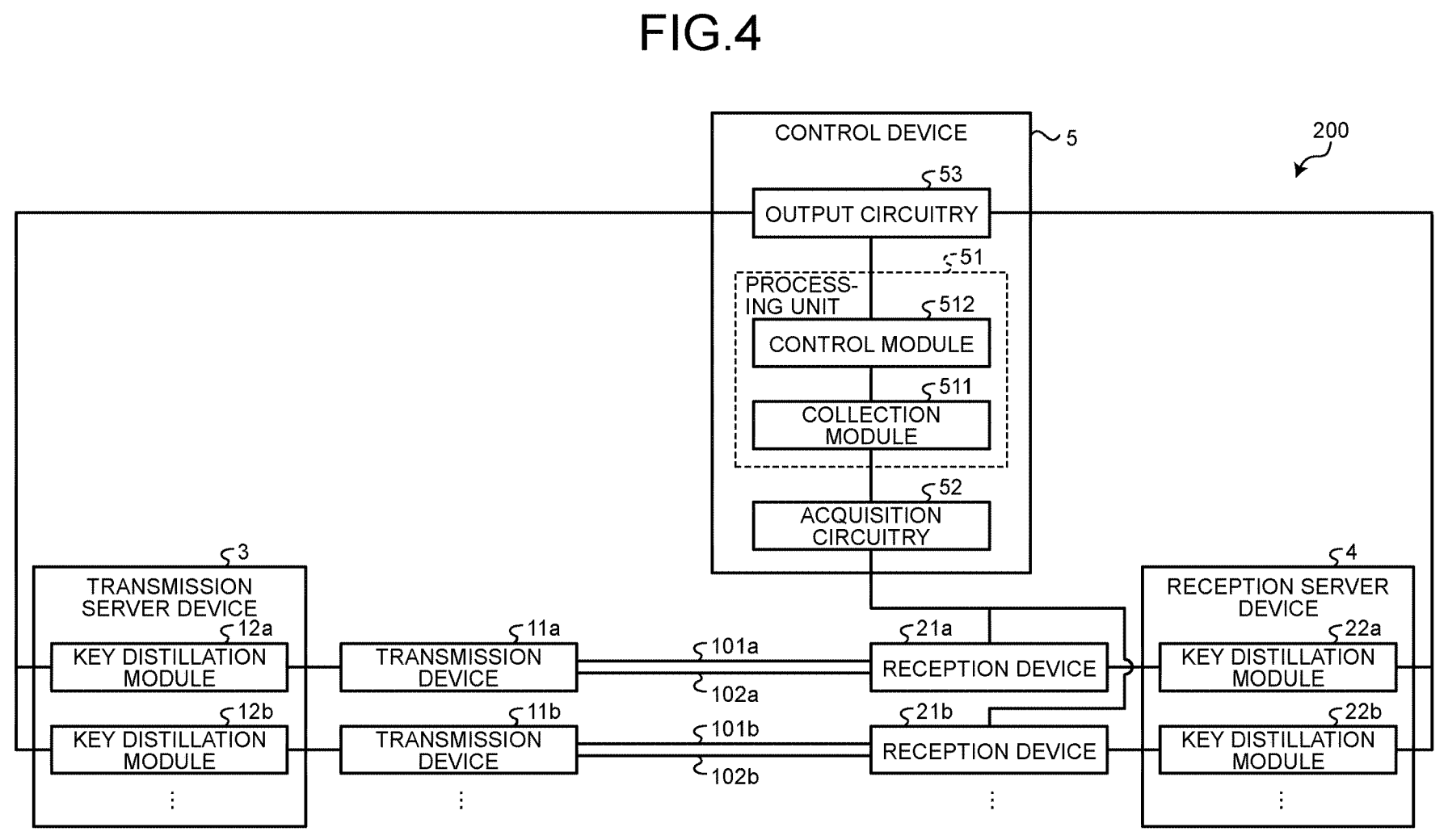

FIG. 4 is a diagram illustrating an example of a device configuration of a quantum cryptographic communication system 200 according to the first embodiment. The quantum cryptographic communication system 200 of the first embodiment includes a control device 5 in addition to a plurality of transmission devices 11 (11*a*-11*b*), a plurality of reception devices 21 (21*a*-21*b*), a transmission server device 3, a reception server device 4, a plurality of optical fiber links 101 (quantum communication paths) and 102 (classical communication paths).

In the example of FIG. 4, a single transmission server device 3 is connected to a plurality of transmission devices 11, and a plurality of (n: n is an integer of 2 or more) key distillation modules 12 (12*a*-12*b*) are operated in the transmission server device 3. Each transmission device 11 and each key distillation module 12 are connected on a one-to-one basis, and the key distillation module 12 performs the key distillation processing based on the key information from the transmission device 11.

Similarly, a single reception server device 4 is connected to a plurality of reception devices 21, and a plurality of (n: n is an integer of 2 or more) key distillation modules 22 (22*a*-22*b*) are operated in the reception server device 4. Each reception device 21 and each key distillation module 22 are connected on a one-to-one basis, and the key distillation module 22 performs the key distillation processing based on the key information from the reception device 21.

Each transmission device 11 and each reception device 21 are connected by two optical fiber links 101 and 102.

The control device 5 includes a processing unit 51, an acquisition circuitry 52, and an output circuitry 53.

The processing unit 51 is realized by at least one processing device, and executes processing of the control device 5. This processing device is realized by, for example, an analog or digital circuit, or the like. The processing device may be a central processing unit (CPU), or may be a general-purpose processor, a microprocessor, a digital signal processor (DSP), an application specific integrated circuit (ASIC), a field-programmable gate array (FPGA), or a combination thereof.

The processing unit 51 includes a collection module 511 and a control module 512.

The collection module 511 acquires the state of quantum communication of the optical fiber link 101 obtained by each reception device 21 and provides the state to the control module 512.

The state of the quantum communication may include arbitrary parameters in addition to the number of detected photons, QBER, and the like. For example, the number of detected photons and QBER are used in a key length calculation formula, but parameters other than the number of detected photons and QBER are also used in the key length calculation formula, and thus, the state of quantum communication including such parameters may be acquired.

In addition, for example, in a case where the decoy system is adopted as the QKD protocol, the number of detected decoy pulses may be included in the state of quantum communication. In this case, for example, the control module 512 determines to allocate resources more to the key distillation module 22 that performs the key distillation of the photon received by the reception device 21 in which the difference between the number of detected decoy pulses and the predetermined value is the second value larger than the first value, other than the key distillation module 22 that performs the key distillation of the photon received by the reception device 21 in which the difference is the first value.

For example, the resource is a processing device of the reception server device 4 used by the key distillation module 22. Specifically, the resource is, for example, a processor of the reception server device 4 used by the key distillation module 22.

Furthermore, the resource is a storage device of the reception server device 4 used by the key distillation module 22. Specifically, the resource is, for example, a main storage device of the reception server device 4 used by the key distillation module 22. Furthermore, the resource is an auxiliary storage device of the reception server device 4 used by the key distillation module 22.

Note that as the number of types of quantum communication states to be considered at the time of resource allocation increases, the accuracy of the allocation increases, while the calculation cost increases.

Furthermore, information other than the state of quantum communication may be acquired from the reception device 21. One of examples is hardware information of the reception device 21.

The hardware information is, for example, numerical information indicating hardware performance of the reception device 21. Specifically, examples of the numerical information of the hardware of the reception device 21 include photon detection sensitivity (related to the number of detected photons) of the reception device 21 and a noise level at the time of detection (related to QBER).

Furthermore, for example, the hardware information includes information indicating an operating state of the hardware of the reception device 21. Specifically, the information indicating the operating state of the hardware includes, for example, information indicating whether the hardware is normally operating, a length of a period during which the hardware is normally operating after operating, whether the hardware is stopped, whether the hardware is broken, and the like. These pieces of information are not reflected in the key length calculation formula, but can be used as reference information of resource allocation.

For example, the control module 512 further acquires first operation information indicating the operation state of the reception device 21*a* from the reception device 21*a*, and further acquires second operation information indicating the operation state of the reception device 21*b* from the reception device 21*b*. For example, in a case where the period during which the reception device 21*b* is operating normally, indicated by the operating state of the second operating information, is longer than the period during which the reception device 21*a* is operating normally, indicated by the operating state of the first operating information, the control module 512 determines to allocate more resources to the key distillation module 22*b* that performs key distillation of photons received by the reception device 21*b*, other than the key distillation module 22*a* that performs key distillation of photons received by the reception device 21*a*. Furthermore, for example, in a case where the first operation information indicates that the reception device 21*a* is not in operation, the control module 512 determines not to allocate a resource to the key distillation module 22*a*.

The control module 512 calculates a resource allocation to be allocated to each of the key distillation modules 12 and 22 on the basis of the state of the quantum communication of each optical fiber link 101 acquired by the collection module 511, and issues an instruction of a resource allocation to the transmission server device 3 and the reception server device 4.

The transmission server device 3 allocates a resource to each key distillation module 12 on the basis of a resource allocation instruction from the control device 5.

Similarly, the reception server device 4 allocates a resource to each key distillation module 22 on the basis of a resource allocation instruction from the control device 5.

The control device 5 constantly acquires the dynamically changing state of the quantum communication, and dynamically changes the resource allocation on the basis of the state of the quantum communication, so that the optimal resource allocation to the key distillation modules 12 and 22 can be realized.

The acquisition circuitry 52 acquires data by communicating in a wireless or wired manner. For example, the acquisition circuitry 52 acquires the state of quantum communication of the optical fiber link 101 from each reception device 21.

The output circuitry 53 outputs data by communicating in a wireless or wired manner. For example, the output circuitry 53 outputs resource information indicating resources to be allocated to the plurality of key distillation modules 12 and 22 to the transmission server device 3 and the reception server device 4.

For example, the resource information includes at least one of information indicating a ratio of using the processors of the transmission server device 3 and the reception server device 4, information indicating a ratio of using the main storage devices of the transmission server device 3 and the reception server device 4, and information indicating a ratio of using the auxiliary storage devices of the transmission server device 3 and the reception server device 4.

In the example of FIG. 4, the control device 5 is realized as a single device, but may be implemented as software on the transmission server device 3 or the reception server device 4.

Example of Control Method

FIG. 5 is a flowchart illustrating an example of a control method according to the first embodiment. First, the collection module 511 acquires information indicating the state of quantum communication from each reception device 21 (Step S1).

Next, the control module 512 calculates the key length of the final encryption key on the basis of the information indicating the state of the quantum communication acquired in Step S1 (Step S2). The key length calculation formula may be, for example, a key length calculation formula adopted in the above-described PA processing, or may be a separately set calculation formula. For example, the longer the key length calculated based on the number of detected photons and the QBER, the higher the load of the key distillation processing, so that more resources are required. As a qualitative tendency, the larger the number of detected photons, the longer the key length, and the higher the QBER, the shorter the key length. When the QBER becomes a constant value, for example, 10% or more, the key length becomes 0.

Next, the control module 512 determines an allocated resource for each key distillation processing based on the key length calculated in Step S2 (Step S3). For example, the control module 512 may determine resource allocation in proportion to the key length. For example, it is assumed that the key length of an encryption key generated from a photon received via the optical fiber link 101*a* is 3 (the unit is arbitrary, for example, a bit, a byte, a length of an encryption key generated per unit time, or the like), the key length of an encryption key generated from a photon received via the optical fiber link 101*b* is 2, and the key length of an encryption key generated from a photon received via the optical fiber link 101*c* is 0. In this case, the control module 512 allocates 60% to the key distillation module 22*a*, 40% to the key distillation module 22*b*, and 0% to the key distillation module 22*c* (not performing the key distillation processing) to the total resource 100%.

That is, the control module 512 determines to allocate more resources to the key distillation module 22 that performs key distillation of photons whose key length is a second value longer, other than the first value than the key distillation module 22 that performs key distillation of photons whose key length is a first value calculated on the basis of the number of detected photons and QBER.

Next, when the resource allocation is determined in Step S3, the output circuitry 53 outputs the above-described resource information to the transmission server device 3 and the reception server device 4, thereby issuing an instruction of the determined resource allocation (Step S4).

Note that, in the example of FIG. 5, as the resource allocation method, a method of determining resource allocation from the key length calculated on the basis of the key length calculation formula has been described, but other methods may be adopted. The resource allocation based on the key length is a method mainly focusing on the PA processing load, but there is also a method mainly focusing on the EC processing load, for example. The EC processing load changes according to the QBER, and when the QBER is high, the EC processing load increases. Therefore, a method of allocating more resources to a link having a higher QBER may be adopted.

However, if the QBER is equal to or greater than a certain value at this time, the EC processing fails. Therefore, the control module 512 does not allocate resources to the key distillation modules 12 and 22 that perform key distillation of photons transmitted and received via the optical fiber link 101 having a QBER of a certain value or more. Specifically, the control module 512 determines to allocate more resources to the key distillation module 22 that performs key distillation of photons received by the optical fiber link 101 (quantum communication path) having the second value of a QBER larger than the first value and equal to or less than a predetermined value, other than the key distillation module 22 that performs key distillation of photons received by the optical fiber link 101 having the first value of a QBER less than or equal to a predetermined value. Then, the control module 512 determines not to allocate resources to the key distillation module 22 that performs key distillation of photons received by the optical fiber link 101 having a QBER larger than a certain value.

In addition, the resource allocation may be changed also by an error correction algorithm adopted in the EC processing. Examples of the error correction algorithm include a cascade method and a low density parity check (LDPC) method. The cascade method can efficiently perform error correction on a higher QBER, and the LDPC method can efficiently perform error correction on a lower QBER.

Therefore, resource allocation may be performed in consideration of the type of the error correction algorithm adopted in the EC processing. For example, in a case where the error correction algorithm is the cascade method, the control module 512 loosens the degree to which more resources are allocated according to an increase in the QBER as compared with a case where the error correction algorithm is the LDPC. Specifically, the control module 512 increases the resource allocation amount at the time when the QBER increases from the first value to the second value in a case where the error correction algorithm is the LDPC, more than the resource allocation amount at the time when QBER increases from the first value to the second value in a case where the error correction algorithm is the cascade method.

As described above, in the first embodiment, the processing unit 51 of the control device 5 acquires information indicating the state of quantum communication from the plurality of reception devices 21 that receive photons via the quantum communication path (in the example of FIG. 4, the optical fiber link 101), and determines resources to be allocated to the plurality of key distillation modules 12 and the plurality of key distillation modules 22 of the server device (in the example of FIG. 4, the transmission server device 3 and the reception server device 4) on the basis of the information indicating the state of quantum communication. Then, the output circuitry 53 of the control device 5 outputs the resource information indicating the resources to be allocated to the plurality of key distillation modules 12 and the plurality of key distillation modules 22 to the server device.

As a result, according to the first embodiment, the resources to be allocated to the plurality of key distillation modules 12 and the plurality of key distillation modules 22 can be more appropriately determined. Specifically, resources allocated to a plurality of key distillation modules 12 (key distillation modules 22) operating on a single transmission server device 3 (reception server device 4) are not insufficient or excessive, and optimum allocation can be realized. As a result, malfunction or processing delay due to resource shortage does not occur in the key distillation processing of the key distillation modules 12 and 22. In addition, since waste of resource allocation is eliminated, specifications required for the transmission server device 3 and the reception server device 4 can also be minimized, leading to cost reduction.

Second Embodiment

Figure 6:
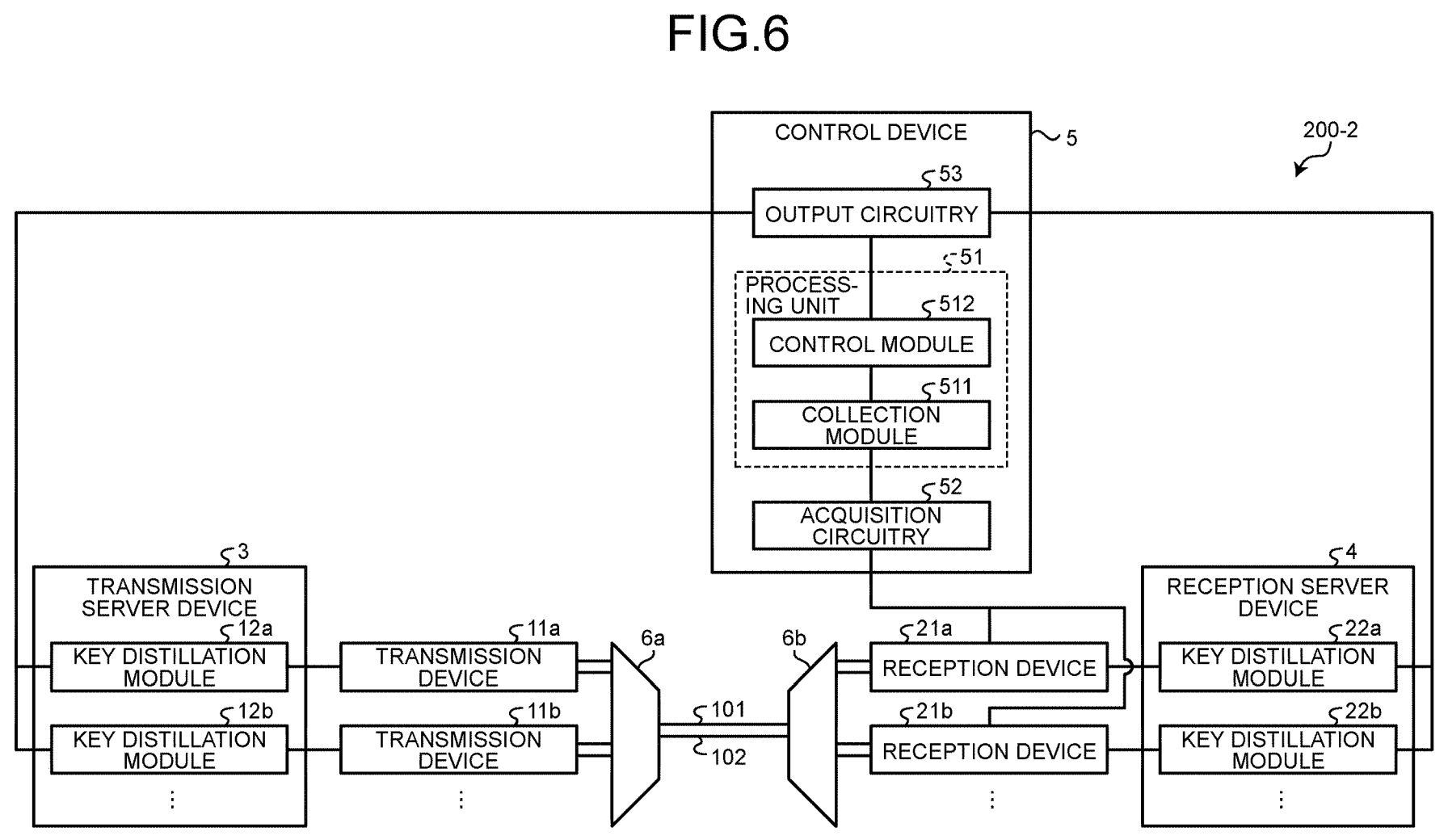

Next, a second embodiment will be described. In the description of the second embodiment, the description similar to that of the first embodiment will be omitted, and points different from those of the first embodiment will be described.
Example of Device Configuration FIG. 6 is a diagram illustrating an example of a device configuration of a quantum cryptographic communication system 200-2 according to the second embodiment. The quantum cryptographic communication system 200-2 of the second embodiment includes a plurality of transmission devices 11 (11a-11b), a plurality of reception devices 21 (21a-21b), a transmission server device 3, a reception server device 4, a control device 5, multiplexers 6a and 6b, optical fiber links 101 (quantum communication path) and 102 (classical communication path).

Differences from the configuration of the first embodiment (FIG. 4) is that the multiplexers 6a and 6b for optical wavelength multiplexing of signals of the plurality of transmission devices 11 (for example, multiplexer modules) are installed, and that the number of optical fiber links 101 and 102 between transmission and reception is limited to two.

The multiplexing device 6a (first multiplexer) performs optical wavelength multiplexing on photons transmitted from the plurality of transmission devices 11. The multiplexer 6b (second multiplexer) receives optical wavelength multiplexed photons.

According to the configuration of FIG. 6, a difference in the state of quantum communication for each quantum communication path is less likely to occur, and a difference in resource allocation due to the state of quantum communication is less likely to occur. However, it is necessary to adjust resources due to a performance difference of the transmission devices 11 and a performance difference of the reception devices 21. For example, in a case where the first numerical information indicating the performance of the hardware of the reception device 21a is further acquired from the reception device 21a, and the second numerical information indicating that the performance of the hardware is higher than that of the first numerical information is further acquired from the reception device 21b, the processing unit 51 determines to allocate more resources to the key distillation module 22b that performs the key distillation of the photon received by the reception device 21b, other than the key distillation module 22a that performs the key distillation of the photon received by the reception device 21a.

Third Embodiment

Figure 7:
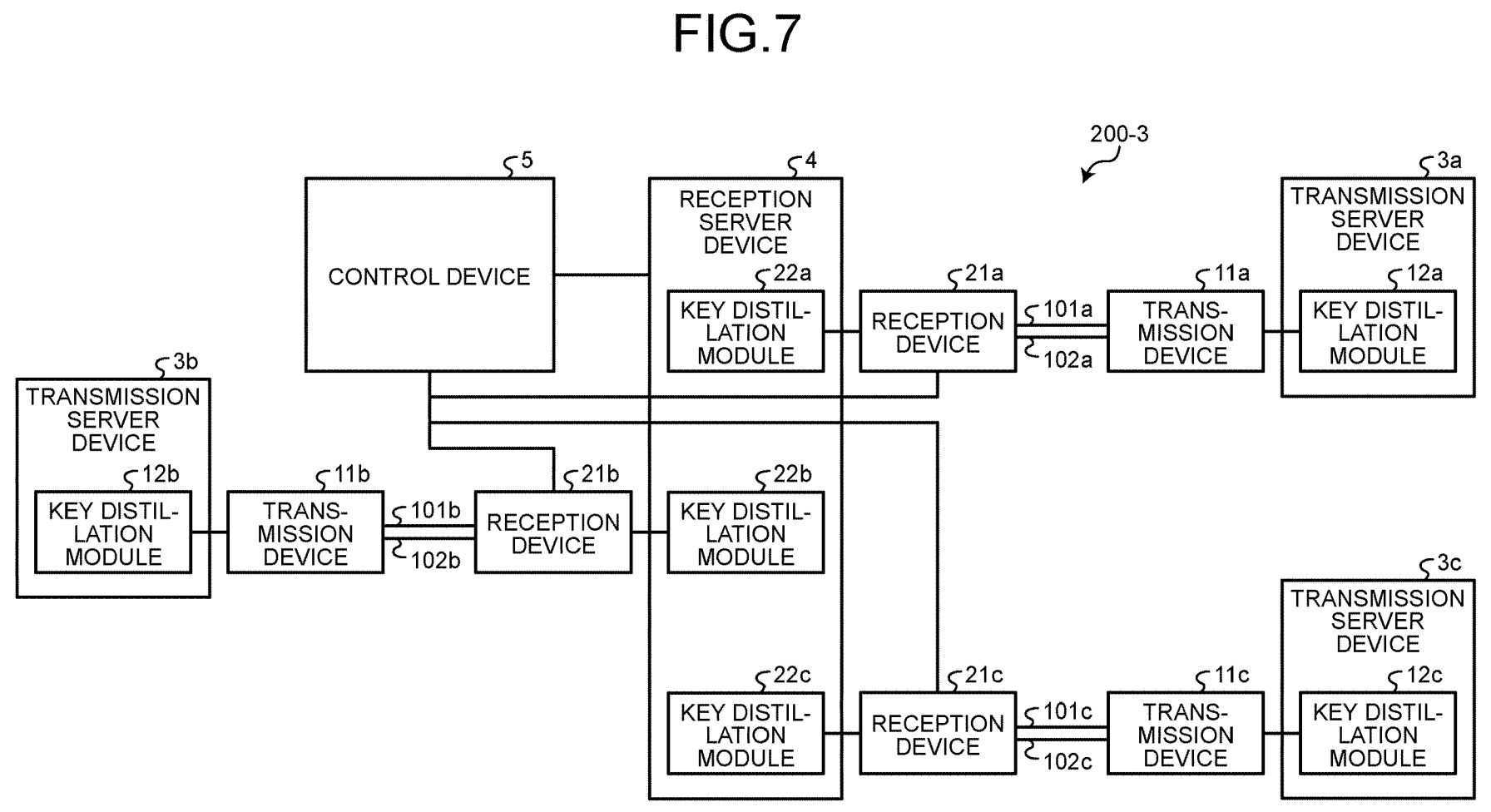

Next, a third embodiment will be described. In the description of the third embodiment, the description similar to that of the first embodiment will be omitted, and points different from those of the first embodiment will be described.
Example of Device Configuration FIG. 7 is a diagram illustrating an example of a device configuration of a quantum cryptographic communication system 200-3 according to the third embodiment. The quantum cryptographic communication system 200-3 of the third embodiment includes a plurality of transmission devices 11 (11a-11c), a plurality of reception devices 21 (21a-21c), a plurality of transmission server devices 3 (3a-3c), a reception server device 4, a control device 5, a plurality of optical fiber links 101 (quantum communication paths) and 102 (classical communication paths). A difference from the configuration of the first embodiment (FIG. 4) is that there is a plurality of transmission server devices 3, and the plurality of transmission server devices 3 communicates with one reception server device 4. This assumes that the transmission server devices 3 are installed in a plurality of different bases.

In this case, one key distillation module 12 operates on each transmission server device 3, and a plurality of key distillation modules 22 (22a-22c) operate on the reception server device 4. Therefore, in the third embodiment, resource allocation is performed to the reception server device 4.

Note that although the example of FIG. 7 illustrates a case where one reception server device 4 is connected to the plurality of transmission server devices 3 via the plurality of reception devices 21, the plurality of optical fiber links 101 (quantum communication paths), and the plurality of transmission devices 11, one transmission server device 3 may be connected to a plurality of reception server devices 4. That is, one transmission server device 3 may be connected to the plurality of reception server devices 4 via the plurality of transmission devices 11, the plurality of optical fiber links 101 (quantum communication paths), and the plurality of reception devices 21.

Fourth Embodiment

Next, a fourth embodiment will be described. In the description of the fourth embodiment, the description similar to that of the first embodiment will be omitted, and points different from those of the first embodiment will be described.

Example of Device Configuration

Figure 8:
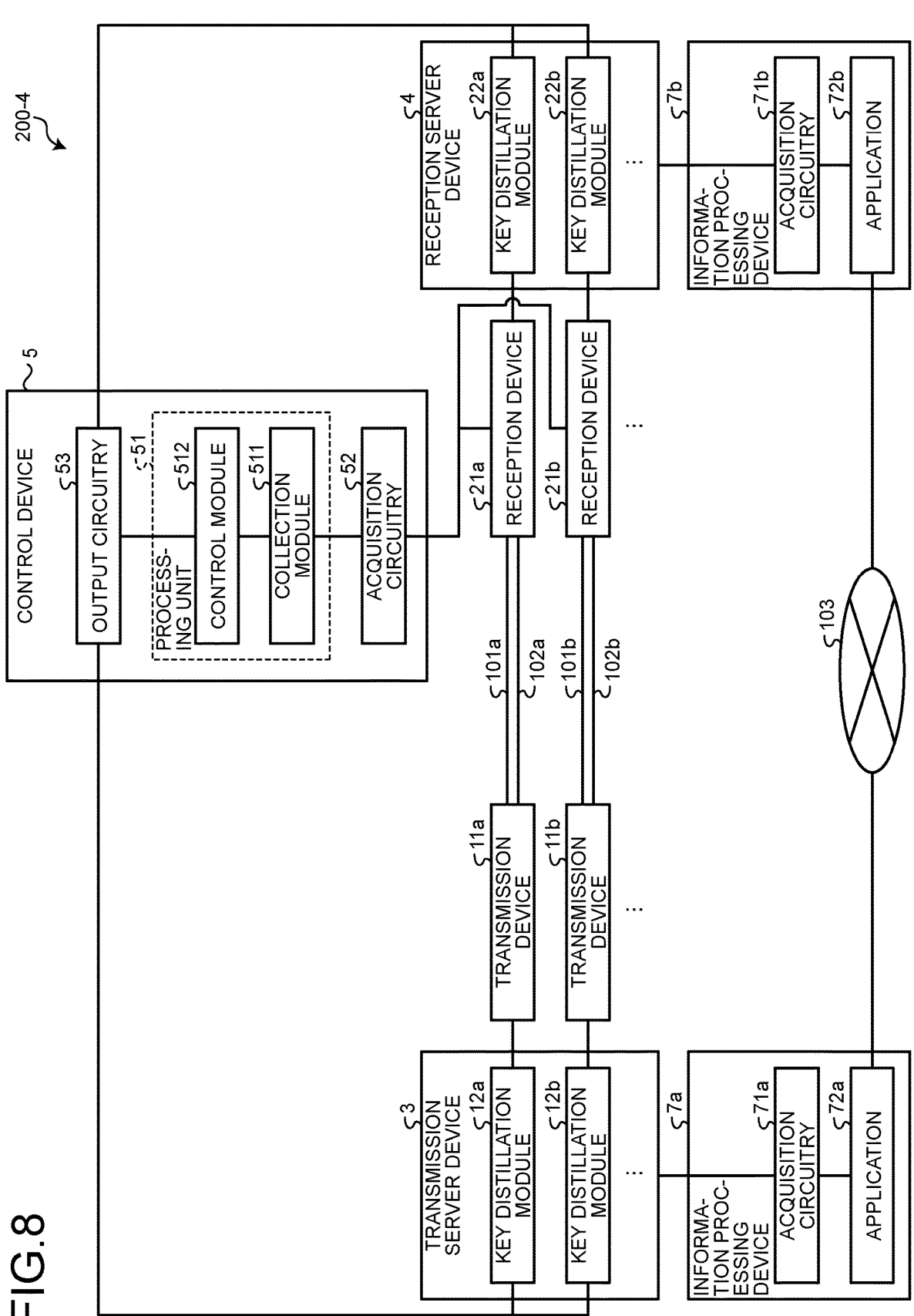
FIG. 8 is a diagram illustrating an example of a device configuration of a quantum cryptographic communication system according to a fourth embodiment.

FIG. 8 is a diagram illustrating an example of a device configuration of a quantum cryptographic communication system 200-4 according to the fourth embodiment. The quantum cryptographic communication system 200-4 of the fourth embodiment includes information processing devices 7 (7a and 7b) and a user network 103 in addition to a plurality of transmission devices 11 (11a-11b), a plurality of reception devices 21 (21a-21b), a transmission server device 3, a reception server device 4, a control device 5, a plurality of optical fiber links 101 (quantum communication paths) and 102 (classical communication paths).

The information processing device 7a is connected to the transmission server device 3 including a plurality of key distillation modules 12 (12a-12b). The information processing device 7b is connected to the reception server device 4 including a plurality of key distillation modules 22 (22a-22b).

The information processing device 7a includes an acquisition circuitry 71a and an application 72a. The acquisition circuitry 71a acquires, from the transmission server device 3, an encryption key subjected to key distillation using resources allocated to the plurality of key distillation modules 12 on the basis of information indicating the state of quantum communication acquired from the plurality of reception devices 21 that receive photons via the optical fiber links 101 (quantum communication paths).

The application 72a performs encrypted communication with an application 72b via the user network 103 using the encryption key acquired from the transmission server device 3. The user network 103 is, for example, the Internet.

Note that the operations of an acquisition circuitry 71b and the application 72b are similar to those of the acquisition circuitry 71a and the application 72a, and thus, description thereof is omitted.

Note that a key management device that manages an encryption key may be installed between the transmission server device 3 and the information processing device 7a. Similarly, a key management device that manages an encryption key may be installed between the reception server device 4 and the information processing device 7b.

Figure 9:
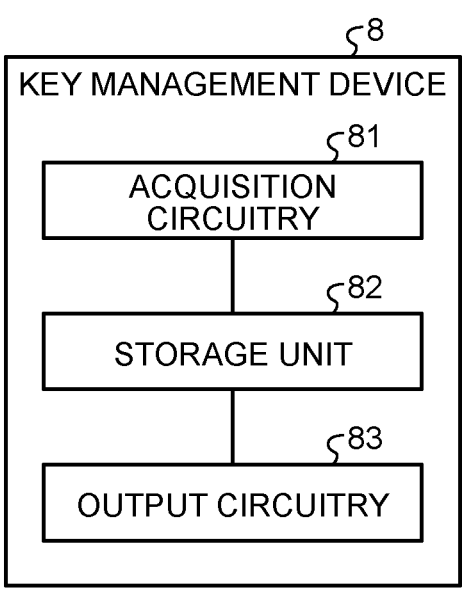
FIG. 9 is a diagram illustrating an example of a configuration of a key management device according to the fourth embodiment.

FIG. 9 is a diagram illustrating an example of a configuration of a key management device 8 according to the fourth embodiment. The key management device 8 of the fourth embodiment includes an acquisition circuitry 81, a storage unit 82, and an output circuitry 83.

The acquisition circuitry 81 acquires data by communicating in a wireless or wired manner. For example, the acquisition circuitry 81 acquires, from the transmission server device 3 or the reception server device 4, an encryption key subjected to key distillation using resources allocated to the plurality of key distillation modules 12 and 22 on the basis of information indicating the state of quantum communication acquired from the plurality of reception devices 21 that receive photons via the optical fiber links 101 (quantum communication paths).

The storage unit 82 stores the encryption key acquired from the transmission server device 3 or the reception server device 4. The storage unit 82 is realized by, for example, a main storage device, an auxiliary storage device, and the like (see FIG. 9 to be described later).

The output circuitry 83 outputs data by communicating in a wireless or wired manner. For example, the output circuitry 83 outputs an encryption key to the application 7a or 7b that performs encrypted communication using the encryption key.

Lastly, examples of hardware configurations of a transmission server device 3, a reception server device 4, and a control device 5 according to the first to fourth embodiments, and an information processing device 7 and a key management device 8 according to the fourth embodiment.

Example of Hardware Configuration

Figure 10:
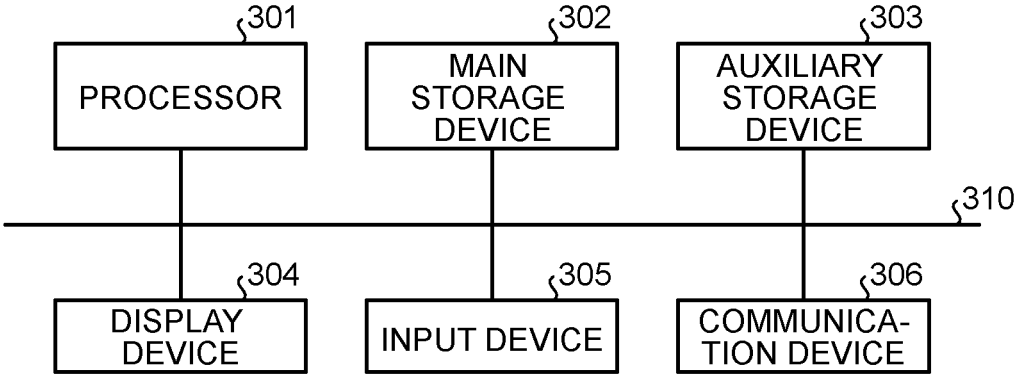
FIG. 10 is a diagram illustrating an example of a hardware configuration of a transmission server device, a reception server device, and a control device according to the first to fourth embodiments, and an information processing device and a key management device according to the fourth embodiment.

FIG. 10 is a diagram illustrating an example of a hardware configuration of the transmission server device 3, the reception server device 4, and the control device 5 according to the first to fourth embodiments, and the information processing device 7 and the key management device 8 according to the fourth embodiment.

The transmission server device 3, the reception server device 4, and the control device 5 of the first to fourth embodiments, and the information processing device 7 and the key management device 8 of the fourth embodiment include a processor 301, a main storage device 302, an auxiliary storage device 303, a display device 304, an input device 305, and a communication device 306. The processor 301, the main storage device 302, the auxiliary storage device 303, the display device 304, the input device 305, and the communication device 306 are connected via a bus 310.

The processor 301 executes a program read from the auxiliary storage device 303 to the main storage device 302. The main storage device 302 is a memory such as a read only memory (ROM) and a random access memory (RAN). The auxiliary storage device 303 is a hard disk drive (HDD), a solid state drive (SSD), a memory card, or the like.

The display device 304 displays display information. The display device 304 is, for example, a liquid crystal display or the like. The input device 305 is an interface for operating the transmission server device 3, the reception server device 4, the control device 5, the information processing device 7, and the key management device 8. The input device 305 is, for example, a keyboard, a mouse, or the like. The communication device 306 is an interface for communicating with other devices.

Note that the transmission server device 3, the reception server device 4, the control device 5, the information processing device 7, and the key management device 8 do not necessarily include the display device 304 and the input device 305. In this case, for example, display functions and input functions of terminals connected to the transmission server device 3, the reception server device 4, the control device 5, the information processing device 7, and the key management device 8 may be used via the communication device 306.

The program executed by the transmission server device 3, the reception server device 4, the control device 5, the information processing device 7, and the key management device 8 is recorded as a file in an installable format or an executable format in a computer-readable storage medium such as a CD-ROM, a memory card, a CD-R, and a digital versatile disc (DVD), and is provided as a computer program product.

In addition, the program executed by the transmission server device 3, the reception server device 4, the control device 5, the information processing device 7, and the key management device 8 may be stored on a computer connected to a network such as the Internet and provided by being downloaded via the network. In addition, the program executed by the transmission server device 3, the reception server device 4, the control device 5, the information processing device 7, and the key management device 8 may be provided via a network such as the Internet without being downloaded.

In addition, the program executed by the transmission server device 3, the reception server device 4, the control device 5, the information processing device 7, and the key management device 8 may be provided by being incorporated in advance in a ROM or the like.

The program executed by the transmission server device 3, the reception server device 4, the control device 5, the information processing device 7, and the key management device 8 has a module configuration including functional blocks that can also be realized by the program among functional configurations (functional blocks) of the transmission server device 3, the reception server device 4, the control device 5, the information processing device 7, and the key management device 8. As actual hardware, each of the functional blocks is loaded on the main storage device 302 by the processor 301 reading and executing the program from the storage medium. That is, the functional blocks are generated on the main storage device 302.

Some or all of the functional blocks described above may be implemented by hardware such as an integrated circuit (IC) without being implemented by software.

In addition, in a case where each function is realized by using a plurality of processors, each processor may realize one of the functions or may realize two or more of the functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control device comprising:

one or more processors configured to:

acquire information indicating a state of quantum communication of a quantum communication path from a plurality of reception devices that receive photons via the quantum communication path, and determine resources to be allocated to a plurality of key distillation modules of a server device based on the information indicating the state of the quantum communication, wherein the information indicating the state of the quantum communication path includes at least one of a quantum bit error rate, a number of detected photons, or a number of detected decoy pulses, and wherein the one or more processors are further configured to perform at least one of a first step, a second step, a third step, a fourth step, or a fifth step, the first step comprising:

determining to allocate the resources more to a second key distillation module other than to a first key distillation module among the plurality of key distillation modules, the first key distillation module being configured to perform key distillation of photons received by a first quantum communication path in which the QBER is a first value less than or equal to a predetermined value, the second key distillation module being configured to perform key distillation of photons received by a second quantum communication path in which the QBER is a second value larger than the first value and less than or equal to the predetermined value; and determining not to allocate the resources to a third key distillation module, of the plurality of key distillation modules, configured to perform key distillation of photons received by a third quantum communication path in which the QBER exceeds the predetermined value;

the second step comprising:

determining to allocate the resources more to a second key distillation module other than to a first key distillation module among the plurality of key distillation modules, the first key distillation module being configured to perform key distillation of photons in which key length, calculated based on the number of detected photons and the QBER, is a first value, the second key distillation module being configured to perform key distillation of photons in which the key length is a second value longer than the first value;

the third step comprising:

loosening a degree of allocating the resources more, according to an increase in the QBER, than an allocation amount of the resources when the QBER increases from a first value to a second value in a case where an error correction algorithm is a cascade method and an allocation amount of the resources when the QBER increases from the first value to the second value in a case where the error correction algorithm is a low density parity check (LDPC);

the fourth step comprising:

determining to allocate the resources more to a second key distillation module other than a first key distillation module among the plurality of key distillation modules, the first key distillation module being configured to perform key distillation of photons received by a first reception device in which a difference between the number of detected decoy pulses and a predetermined value is a first value, the second key distillation module being configured to perform key distillation of photons received by a second reception device in which the difference is a second value larger than the first value;

the fifth step comprising:

acquiring, from a first reception device, first numerical information indicating performance of hardware of the first reception device;

further acquiring, from a second reception device, second numerical information indicating that performance of hardware is higher than that of the first numerical information; and determining to allocate the resources more to a second key distillation module other than a first key distillation module among the plurality of key distillation modules, the first key distillation module being configured to perform key distillation of photons received by the first reception device, the second key distillation module being configured to perform key distillation of photons received by the second reception device; and the sixth step comprising:

acquiring, from a first reception device, first operation information indicating an operation state of the first reception device, and further acquire, from a second reception device, second operation information indicating an operation state of the second reception device;

determining to allocate the resources more to a second key distillation module other than a first key distillation module among the plurality of key distillation modules, the first key distillation module being configured to perform key distillation of photons received by the first reception device when a period, during which the second reception device is operating normally, indicated by the operating state of the second operating information is longer than a period, during which the first reception device is operating normally, indicated by the operating state of the first operating information, the second key distillation module being configured to perform key distillation of photons received by the second reception device; and determining not to allocate the resources to the first key distillation module when the first operating information indicates that the first reception device is not operating; and output circuitry configured to output resource information indicating the resources to be allocated to the plurality of key distillation modules of the server device.

2. The device according to claim 1, wherein the resource information includes at least one of information indicating a ratio of using a processor of the server device, information indicating a ratio of using a main storage device of the server device, and information indicating a ratio of using an auxiliary storage device of the server device.

3. A quantum cryptographic communication system comprising:

a control device comprising:

one or more processors configured to acquire information indicating a state of quantum communication of a quantum communication path from a plurality of reception devices that receive photons via the quantum communication path, and determine resources to be allocated to a plurality of key distillation modules of a server device based on the information indicating the state of the quantum communication, wherein the information indicating the state of the quantum communication path includes at least one of a quantum bit error rate, a number of detected photons, or a number of detected decoy pulses, and wherein the one or more processors are further configured to perform at least one of a first step, a second step, a third step, a fourth step, or a fifth step, the first step comprising:

determining to allocate the resources more to a second key distillation module other than to a first key distillation module among the plurality of key distillation modules, the first key distillation module being configured to perform key distillation of photons received by a first quantum communication path in which the QBER is a first value less than or equal to a predetermined value, the second key distillation module being configured to perform key distillation of photons received by a second quantum communication path in which the QBER is a second value larger than the first value and less than or equal to the predetermined value; and determining not to allocate the resources to a third key distillation module, of the plurality of key distillation modules, configured to perform key distillation of photons received by a third quantum communication path in which the QBER exceeds the predetermined value;

the second step comprising:

determining to allocate the resources more to a second key distillation module other than to a first key distillation module among the plurality of key distillation modules, the first key distillation module being configured to perform key distillation of photons in which key length, calculated based on the number of detected photons and the QBER, is a first value, the second key distillation module being configured to perform key distillation of photons in which the key length is a second value longer than the first value;

the third step comprising:

loosening a degree of allocating the resources more, according to an increase in the QBER, than an allocation amount of the resources when the QBER increases from a first value to a second value in a case where an error correction algorithm is a cascade method and an allocation amount of the resources when the QBER increases from the first value to the second value in a case where the error correction algorithm is a low density parity check (LDPC);

the fourth step comprising:

determining to allocate the resources more to a second key distillation module other than a first key distillation module among the plurality of key distillation modules, the first key distillation module being configured to perform key distillation of photons received by a first reception device in which a difference between the number of detected decoy pulses and a predetermined value is a first value, the second key distillation module being configured to perform key distillation of photons received by a second reception device in which the difference is a second value larger than the first value;

the fifth step comprising:

acquiring, from a first reception device, first numerical information indicating performance of hardware of the first reception device;

further acquiring, from a second reception device, second numerical information indicating that performance of hardware is higher than that of the first numerical information; and determining to allocate the resources more to a second key distillation module other than a first key distillation module among the plurality of key distillation modules, the first key distillation module being configured to perform key distillation of photons received by the first reception device, the second key distillation module being configured to perform key distillation of photons received by the second reception device; and the sixth step comprising:

acquiring, from a first reception device, first operation information indicating an operation state of the first reception device, and further acquire, from a second reception device, second operation information indicating an operation state of the second reception device;

determining to allocate the resources more to a second key distillation module other than a first key distillation module among the plurality of key distillation modules, the first key distillation module being configured to perform key distillation of photons received by the first reception device when a period, during which the second reception device is operating normally, indicated by the operating state of the second operating information is longer than a period, during which the first reception device is operating normally, indicated by the operating state of the first operating information, the second key distillation module being configured to perform key distillation of photons received by the second reception device; and determining not to allocate the resources to the first key distillation module when the first operating information indicates that the first reception device is not operating;

output circuitry configured to output resource information indicating the resources to be allocated to the plurality of key distillation modules of the server device;

a plurality of transmission devices configured to transmit the photons via the quantum communication path;

a transmission server device connected to the plurality of transmission devices;

the plurality of reception devices configured to receive the photons via the quantum communication path; and a reception server device connected to the plurality of reception devices.

4. The system according to claim 3, wherein the reception server device is connected to a plurality of the transmission server devices via the plurality of reception devices, the quantum communication path, and the plurality of transmission devices.

5. The system according to claim 3, wherein the transmission server device is connected to a plurality of the reception server devices via the plurality of transmission devices, the quantum communication path, and the plurality of reception devices.

6. The system according to claim 3, wherein the quantum communication path includes a plurality of optical fiber links, and the plurality of transmission devices and the plurality of reception devices are connected by the plurality of optical fiber links.

7. The system according to claim 3, further comprising:

a first multiplexer configured to perform optical wavelength multiplexing on photons transmitted from the plurality of transmission devices; and a second multiplexer configured to receive the optical wavelength multiplexed photons, wherein the quantum communication path includes one optical fiber link.

8. A control method comprising:

acquiring, by a control device, information indicating a state of quantum communication of a quantum communication path from a plurality of reception devices that receive photons via the quantum communication path, and determining resources to be allocated to a plurality of key distillation modules of a server device based on the information indicating the state of the quantum communication, wherein the information indicating the state of the quantum communication path includes at least one of a quantum bit error rate, a number of detected photons, or a number of detected decoy pulses, and wherein the method further includes performing at least one of a first step, a second step, a third step, a fourth step, or a fifth step, the first step comprising:

determining to allocate the resources more to a second key distillation module other than to a first key distillation module among the plurality of key distillation modules, the first key distillation module being configured to perform key distillation of photons received by a first quantum communication path in which the QBER is a first value less than or equal to a predetermined value, the second key distillation module being configured to perform key distillation of photons received by a second quantum communication path in which the QBER is a second value larger than the first value and less than or equal to the predetermined value; and determining not to allocate the resources to a third key distillation module, of the plurality of key distillation modules, configured to perform key distillation of photons received by a third quantum communication path in which the QBER exceeds the predetermined value;

the second step comprising:

determining to allocate the resources more to a second key distillation module other than to a first key distillation module among the plurality of key distillation modules, the first key distillation module being configured to perform key distillation of photons in which key length, calculated based on the number of detected photons and the QBER, is a first value, the second key distillation module being configured to perform key distillation of photons in which the key length is a second value longer than the first value;

the third step comprising:

loosening a degree of allocating the resources more, according to an increase in the QBER, than an allocation amount of the resources when the QBER increases from a first value to a second value in a case where an error correction algorithm is a cascade method and an allocation amount of the resources when the QBER increases from the first value to the second value in a case where the error correction algorithm is a low density parity check (LDPC);

the fourth step comprising:

determining to allocate the resources more to a second key distillation module other than a first key distillation module among the plurality of key distillation modules, the first key distillation module being configured to perform key distillation of photons received by a first reception device in which a difference between the number of detected decoy pulses and a predetermined value is a first value, the second key distillation module being configured to perform key distillation of photons received by a second reception device in which the difference is a second value larger than the first value;

the fifth step comprising:

acquiring, from a first reception device, first numerical information indicating performance of hardware of the first reception device;

further acquiring, from a second reception device, second numerical information indicating that performance of hardware is higher than that of the first numerical information; and determining to allocate the resources more to a second key distillation module other than a first key distillation module among the plurality of key distillation modules, the first key distillation module being configured to perform key distillation of photons received by the first reception device, the second key distillation module being configured to perform key distillation of photons received by the second reception device; and the sixth step comprising:

acquiring, from a first reception device, first operation information indicating an operation state of the first reception device, and further acquire, from a second reception device, second operation information indicating an operation state of the second reception device;

determining to allocate the resources more to a second key distillation module other than a first key distillation module among the plurality of key distillation modules, the first key distillation module being configured to perform key distillation of photons received by the first reception device when a period, during which the second reception device is operating normally, indicated by the operating state of the second operating information is longer than a period, during which the first reception device is operating normally, indicated by the operating state of the first operating information, the second key distillation module being configured to perform key distillation of photons received by the second reception device; and determining not to allocate the resources to the first key distillation module when the first operating information indicates that the first reception device is not operating; and outputting, by the control device, resource information indicating the resources to be allocated to the plurality of key distillation modules of the server device.

9. A computer program product comprising a non-transitory computer-readable medium including programmed instructions, the instructions causing a computer to execute:

acquiring, information indicating a state of quantum communication of a quantum communication path from a plurality of reception devices that receive photons via the quantum communication path, and determining resources to be allocated to a plurality of key distillation modules of a server device based on the information indicating the state of the quantum communication, wherein the information indicating the state of the quantum communication path includes at least one of a quantum bit error rate, a number of detected photons, or a number of detected decoy pulses, and wherein the instructions further cause the computer to perform at least one of a first step, a second step, a third step, a fourth step, or a fifth step, the first step comprising:

determining to allocate the resources more to a second key distillation module other than to a first key distillation module among the plurality of key distillation modules, the first key distillation module being configured to perform key distillation of photons received by a first quantum communication path in which the QBER is a first value less than or equal to a predetermined value, the second key distillation module being configured to perform key distillation of photons received by a second quantum communication path in which the QBER is a second value larger than the first value and less than or equal to the predetermined value; and determining not to allocate the resources to a third key distillation module, of the plurality of key distillation modules, configured to perform key distillation of photons received by a third quantum communication path in which the QBER exceeds the predetermined value;

the second step comprising:

determining to allocate the resources more to a second key distillation module other than to a first key distillation module among the plurality of key distillation modules, the first key distillation module being configured to perform key distillation of photons in which key length, calculated based on the number of detected photons and the QBER, is a first value, the second key distillation module being configured to perform key distillation of photons in which the key length is a second value longer than the first value;

the third step comprising:

loosening a degree of allocating the resources more, according to an increase in the QBER, than an allocation amount of the resources when the QBER increases from a first value to a second value in a case where an error correction algorithm is a cascade method and an allocation amount of the resources when the QBER increases from the first value to the second value in a case where the error correction algorithm is a low density parity check (LDPC);

the fourth step comprising:

determining to allocate the resources more to a second key distillation module other than a first key distillation module among the plurality of key distillation modules, the first key distillation module being configured to perform key distillation of photons received by a first reception device in which a difference between the number of detected decoy pulses and a predetermined value is a first value, the second key distillation module being configured to perform key distillation of photons received by a second reception device in which the difference is a second value larger than the first value;

the fifth step comprising:

acquiring, from a first reception device, first numerical information indicating performance of hardware of the first reception device;

further acquiring, from a second reception device, second numerical information indicating that performance of hardware is higher than that of the first numerical information; and determining to allocate the resources more to a second key distillation module other than a first key distillation module among the plurality of key distillation modules, the first key distillation module being configured to perform key distillation of photons received by the first reception device, the second key distillation module being configured to perform key distillation of photons received by the second reception device; and the sixth step comprising:

acquiring, from a first reception device, first operation information indicating an operation state of the first reception device, and further acquire, from a second reception device, second operation information indicating an operation state of the second reception device;

determining to allocate the resources more to a second key distillation module other than a first key distillation module among the plurality of key distillation modules, the first key distillation module being configured to perform key distillation of photons received by the first reception device when a period, during which the second reception device is operating normally, indicated by the operating state of the second operating information is longer than a period, during which the first reception device is operating normally, indicated by the operating state of the first operating information, the second key distillation module being configured to perform key distillation of photons received by the second reception device; and determining not to allocate the resources to the first key distillation module when the first operating information indicates that the first reception device is not operating; and outputting resource information indicating the resources to be allocated to the plurality of key distillation modules of the server device.

\* \* \* \* \*